(12) United States Patent
Ye et al.

(10) Patent No.: US 11,636,368 B2
(45) Date of Patent: Apr. 25, 2023

(54) PROBABILISTIC MULTIGRAPH MODELING FOR IMPROVING THE QUALITY OF CROWDSOURCED AFFECTIVE DATA

(71) Applicant: The Penn State Research Foundation, University Park, PA (US)

(72) Inventors: Jianbo Ye, State College, PA (US); Jia Li, State College, PA (US); James Z. Wang, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 1418 days.

(21) Appl. No.: 15/862,458

(22) Filed: Jan. 4, 2018

(65) Prior Publication Data
US 2019/0114556 A1 Apr. 18, 2019

Related U.S. Application Data

(60) Provisional application No. 62/572,937, filed on Oct. 16, 2017.

(51) Int. Cl.
G06N 20/00 (2019.01)
G06N 7/01 (2023.01)
(Continued)

(52) U.S. Cl.
CPC ............. *G06N 7/01* (2023.01); *G06F 17/18* (2013.01); *G06V 40/10* (2022.01); *G06V 40/166* (2022.01);
(Continued)

(58) Field of Classification Search
CPC ........ G06N 7/005; G06N 20/00; G06F 17/18; G06F 16/9024; G06V 40/10;
(Continued)

(56) References Cited

U.S. PATENT DOCUMENTS 8,965,822 B2 * 2/2015 Frank ..................... G06N 20/00
706/45
9,116,880 B2 * 8/2015 Dolan ..................... G06F 40/40
(Continued)

OTHER PUBLICATIONS

A. P. Dawid and A. M. Skene, "Maximum likelihood estimation of observer error-rates using the em algorithm," Applied Statistics, pp. 20-28, 1979.
(Continued)

*Primary Examiner* — Philip P. Dang
(74) *Attorney, Agent, or Firm* — Dinsmore & Shohl LLP

(57) ABSTRACT

A method of improving quality of crowdsourced affective data based on agreement relationship between a plurality of annotators include receiving, by a processor, a collection of stimuli previously given affective labels by the plurality of annotators, executing, by a processor, an algorithm operative to perform the steps including constructing an agreement multigraph as a probabilistic model including a pair-wise status of agreement between the affective labels given by different ones of the plurality of annotators, learning the probabilistic model computationally using the crowdsourced affective data, identifying a reliability of each of the plurality of annotators based on the learned model, and adjusting the crowdsourced affective data by calculating the affective labels of each stimuli based on the identified reliability of each of the plurality of annotators, thereby improving the quality of the crowdsourced affective data.

20 Claims, 8 Drawing Sheets

(51) Int. Cl.
*G06F 17/18* (2006.01)
*G06V 40/10* (2022.01)
*G06V 40/16* (2022.01)
*G06F 16/901* (2019.01)

(52) U.S. Cl.
CPC ........ *G06V 40/174* (2022.01); *G06F 16/9024* (2019.01)

(58) Field of Classification Search
CPC .. G06V 40/166; G06V 40/174; G06Q 10/103; G06Q 30/0201
See application file for complete search history.

(56) References Cited

U.S. PATENT DOCUMENTS

| | | | | |
|---|---|---|---|---|
| 9,347,779 | B1* | 5/2016 | Lynch | G01S 19/393 |
| 9,493,130 | B2* | 11/2016 | Penilla | G10L 25/63 |
| 9,665,832 | B2* | 5/2017 | Thieberger | G06N 5/04 |
| 9,727,371 | B2* | 8/2017 | Johnson | G06F 40/30 |
| 9,916,538 | B2* | 3/2018 | Zadeh | A61B 5/7221 |
| 9,996,973 | B2* | 6/2018 | Shuster | G06T 19/006 |
| 10,052,026 | B1* | 8/2018 | Tran | A61B 5/165 |
| 10,198,505 | B2* | 2/2019 | Frank | G06Q 10/101 |
| 10,261,947 | B2* | 4/2019 | Frank | G06Q 30/0203 |
| 10,268,507 | B2* | 4/2019 | Wardell | G06F 9/5072 |
| 10,387,898 | B2* | 8/2019 | Frank | G06Q 30/0201 |
| 11,031,133 | B2* | 6/2021 | Proctor Beauchamp | G16Z 99/00 |
| 2016/0224803 | A1* | 8/2016 | Frank | G06F 21/6245 |
| 2016/0300252 | A1* | 10/2016 | Frank | G06F 21/6245 |
| 2016/0335355 | A1* | 11/2016 | Vandanapu | G06F 16/9535 |
| 2018/0001184 | A1* | 1/2018 | Tran | G09B 19/0038 |

OTHER PUBLICATIONS

Y. J. Wang and G. Y. Wong, "Stochastic blockmodels for directed graphs," Journal of the American Statistical Association, vol. 82, No. 397, pp. 8-19, 1987.

* cited by examiner

| Annotator ID | Valence | Reliability |
|---|---|---|
| 3474 | 5.1/8 | 0.08 |
| 2500 | 0.0/8 | 0.56 |
| 3475 | 0.0/8 | 0.34 |
| 2540 | 8.0/8 | 0.04 |

Image Confidence: 75% ($\leq$ 90%)

| Ranges | ≤ 0.2 | 0.2~0.4 | 0.4~0.6 | 0.6~0.8 | ≥0.8 |
|---|---|---|---|---|---|
| Counts | 54 | 34 | 12 | 0 | 0 |

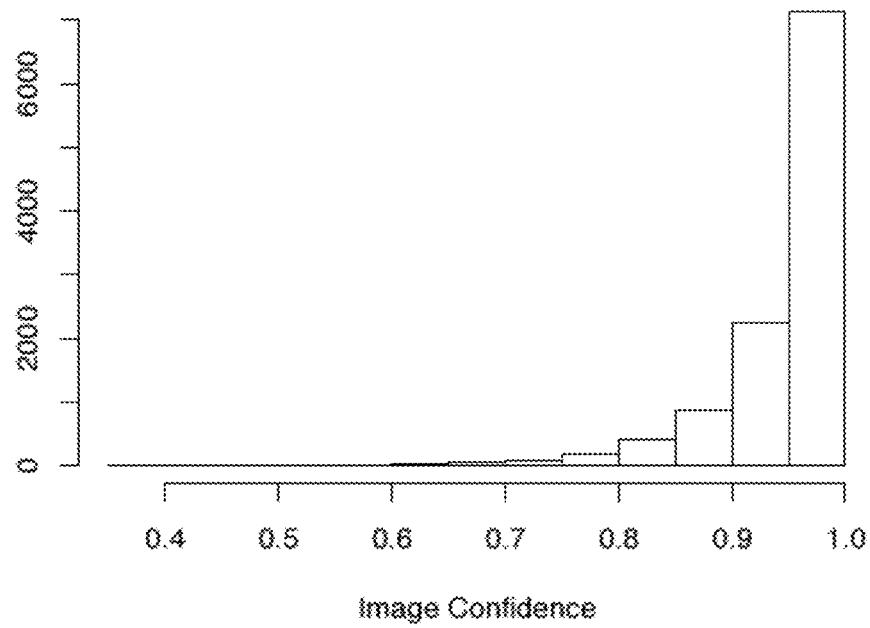
Figure 10
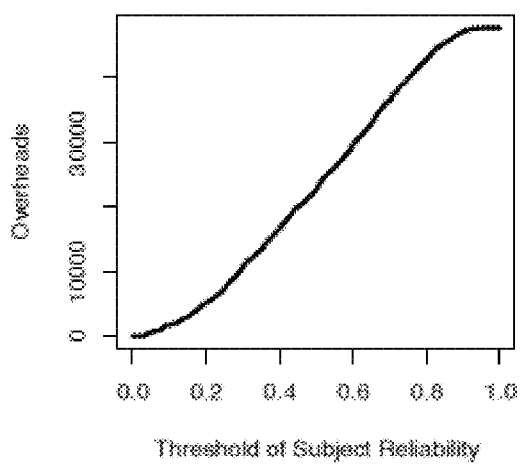 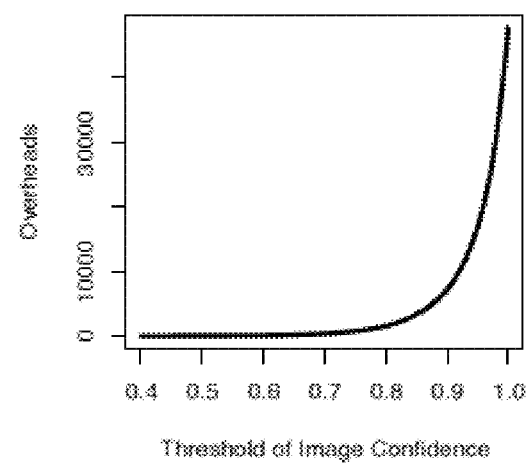
Figure 11A                                              Figure 11B

Figure 12

PROBABILISTIC MULTIGRAPH MODELING FOR IMPROVING THE QUALITY OF CROWDSOURCED AFFECTIVE DATA

CROSS-REFERENCE TO RELATED APPLICATIONS

This application claims priority from Provisional Application No. 62/572,937 filed Oct. 16, 2017, the entire content of which is incorporated herein by reference.

STATEMENT OF GOVERNMENT SPONSORSHIP

This invention was made with government support under Grant No. IIS1110970 awarded by the National Science Foundation. The Government has certain rights in the invention.

FIELD OF THE INVENTION

The present invention relates generally to data collection for emotion modeling, and in particular, to analysis of crowdsourced data using a probabilistic multigraph model.

BACKGROUND

Humans' sensitivity to affective stimuli intrinsically varies from one person to another. Differences in gender, age, society, culture, personality, social status, and personal experience can contribute to its high variability between people. Further, inconsistencies may also exist for the same individual across environmental contexts and current mood or affective state. The causal effects and factors for such affective experiences have been extensively investigated, as evident in the literature on psychological and human studies, where controlled experiments are commonly conducted within a small group of human subjects to ensure the reliability of collected data. To complement the shortcomings of those controlled experiments, ecological psychology aims to understand how objects and things in our surrounding environments effect human behaviors and affective experiences, in which real-world studies are favored over those within artificial laboratory environments. The key ingredient of those ecological approaches is the availability of large-scale data collected from human subjects, remedying the high complexity and heterogeneity that the real-world has to offer. With the growing attention on affective computing, multiple data-driven approaches have been developed to understand what particular environmental factors drive the feelings of humans (Datta et al. 2006; Lu et al. 2012), and how those effects differ among various sociological structures and between human groups.

One crucial hurdle for those affective computing approaches is the lack of full-spectrum annotated stimuli data at a large scale. To address this bottleneck, crowdsourcing-based approaches are highly helpful for collecting uncontrolled human data from anonymous participants. In a recent study reported in (Lu 2015), anonymous subjects from the Internet were recruited to annotate a set of visual stimuli (images): at each time point, after being presented with an image stimulus, participants were asked to assess their personal psychological experiences using ordinal scales for each of the affective dimensions: valence, arousal, dominance and likeness (which means the degree of appreciation in our context). This study also collected demographics data to analyze individual difference predictors of affective responses. Because labeling a large number of visual stimuli can become tedious, even with crowdsourcing, each image stimulus was examined by only a few subjects. This study allowed tens of thousands of images to obtain at least one label from a participant, which created a large data set for environmental psychology and automated emotion analysis of images.

One interesting question to investigate, however, is whether the affective labels provided by subjects are reliable. A related question is how to separate spammers from reliable subjects, or at least to narrow the scope of data to a highly reliable subgroup. Here, spammers are defined as those participants who provide answers without serious consideration of the presented questions. No answer from a statistical perspective is known yet for crowdsourced affective data.

A great difficulty in analyzing affective data is caused by the absence of ground truth in the first place, that is, there is no correct answer for evoked emotion. It is generally accepted that even the most reliable subjects can naturally have varied emotions. Indeed, with variability among human responses anticipated, psychological studies often care about questions such as where humans are emotionally consistent and where they are not, and which subgroups of humans are more consistent than another. Given a population, many, if not the vast majority of stimuli may not have a consensus emotion at all. Majority voting or (weighted) averaging to force an "objective truth" of the emotional response or probably for the sake of convenience, as is routinely done in affective computing so that classification on a single quantity can be carried out, is a crude treatment bound to erase or disregard information essential for many interesting psychological studies, e.g., to discover connections between varied affective responses and varied demographics.

The involvement of spammers as participating subjects introduces an extra source of variation to the emotional responses, which unfortunately is tangled with the "appropriate" variation. If responses associated with an image stimulus contain answers by spammers, the inter-annotator variation for the specific question could be as large as the variation across different questions, reducing the robustness of any analysis.

SUMMARY OF THE INVENTION

Estimating the reliability of subjects is necessary in crowdsourcing-based data collection because the incentives of participants and the interest of researchers diverge.

This invention can be applied to crowdsourced affective data from any type of stimuli. For the purpose of ease of discussion and illustrating the effectiveness and performance of the invention, we use image stimuli as an example. However, the invention can be readily applied to other types of stimuli including videos, natural language texts, virtual reality experiences, sounds, artifacts, and commercial products. For the remaining of this document, we use images as an example.

The present invention provides a method to assess the quality of crowdsourced affective data that deviates fundamentally from the standard approaches much concerned with hunting for "ground truth" emotion stimulated by an image. An individual's emotion response is expected to be naturally different because it depends on subjective opinions rooted in the individual's lifetime exposure to images and concepts. The present method focuses on the relational knowledge about the ratings of the subjects. The analysis according to the present method steps away from the use of "ground truth" by recasting the data as relational quantities.

Let a task be the provision of emotion responses for one image. Consider a task or test conducted by a number of participants. Their responses within this task form a subgroup of data. If the mutual agreement rate between two participants does not depend on the actual specified task, we can essentially convert the resulting problem to a graph mining problem, where subjects are vertices, agreements are edges, and the proximity between subjects is modeled by how likely they agree with each other in a general sense.

In the present invention, the mixed memberships are adopted where two particular modes of memberships are modeled for each subject, one being the reliable mode and the other the random mode. For the random mode, the behavior is assumed to be shared across different subjects, whereas the regular behaviors of subjects in the reliable mode are assumed to be different. In the present invention does not rely on the assumption that the mutual agreement rate between two participants does not depend on the actual specified task. Instead, the random effects are added to subjects' performance in each task via a multigraph approach. The present approach starts from the multigraph structure among subjects that is coordinated by tasks.

The present method also deals with the involvement of spammers in a new way. An example is shown in FIG. 1. Most annotators labeling this image are deemed unreliable, and two of them are highly susceptible as spammers according to model. Investigators may be recommended to eliminate this image or acquire more reliable labels for its use. Yet, one should not be swayed by this example into the practice of discarding images that solicited responses of a large range. Certain images are controversial in nature and will stimulate quite different emotions to different viewers. The present system acquired the reliability scores shown in FIG. 1 by examining the entire data set; the data on this image alone would not be conclusive, in fact, far from so.

Facing the intertwined "appropriate" and "inappropriate" variations in the subjects as well as the variations in the images, the present invention takes a global approach to unravel the sources of uncertainties. The judgment on the reliability of a subject cannot be a per-image decision, and has to leverage the whole data. The present model was constructed to integrate these uncertainties, attempting to discern them with the help of big data. In addition, due to the lack of ground truth labels, the relational data is modeled to code whether two subjects' emotion responses on an image agree, bypassing the thorny questions of what the true labels are and if they exist at all.

The present system improves its assessment about which images evoke highly consensus emotion responses and which subjects are reliable. At the beginning, the lack of either kind of information obscures the truth about the other. Or equivalently, knowing either makes the understanding of the other easy. This is a chicken-and-egg situation. Like the proposed way of learning languages, our system pulls out of the dilemma by recursively enhancing the understanding of one side conditioned on what has been known about the other.

For the sake of automated emotion analysis of images, one also needs to narrow the scope to parts of data, each of which have sufficient number of qualified labels. The present work computes image confidences, which can support off-line data filtering or guide on-line budgeted crowdsourcing practices.

In the present invention, a probabilistic multigraph model approach is provided for systematic analysis of crowdsourced affective data.

The agreement multigraph may be defined to represent whether a subject pair agrees with each other on stimulus of a collection of the images, indicated by a binary indicator. The binary indicator may be 1 if the answers from the subject pair meet a certain criteria, 0 if they do not.

Next, a probabilistic approach, called Gated Latent Beta Allocation (GLBA), is provided to construct and analyze the multigraph data. The GLBA model may be constructed based on reliability parameter for measuring how likely a human responds to a question seriously, regularity parameters for measuring how often a human agrees with other seriously-entered responses from a targeted population, and rate of agreement by chance, which is pre-set;

The binary indicators may be generated from a probabilistic process with two latent variable. The first latent variable indicates whether the subject is reliable, the first latent variable and may have a Bernoulli distribution based on the reliability parameter. Each subject may have a first latent variable. The second latent variable indicates the extent the subject agrees with the other reliable responses and may have a Beta distribution parameterized by regularity parameters.

If the first latent variable of the second subject is 1 indicating that the second subject is reliable, then the binary indicator has a Bernoulli distribution based on the second latent variable of the first subject.

If the first latent variable of the second subject is zero indicating that the second subject is unreliable, then the binary indicator has a Bernoulli distribution based on the rate of agreement by chance.

The GLBA model can be made symmetric achieved by using a conditional distribution.

The present method computes maximum a posteriori probability (MAP) estimates of each subject's reliability and regularity parameters based on a variational expectation-maximization (EM) framework. With this method, investigators running affective human subject studies can substantially reduce or eliminate the contamination caused by spammers, hence improve the quality and usefulness of collected data (FIG. 2).

The present method connects probabilistic observer models with probabilistic graphs. The contributions of the present invention can be summarized as follows:

A probabilistic multigraph model is developed to analyze crowdsourced data and the estimation of the parameters of the model is approximated using a variational EM algorithm. The present method, accepting the intrinsic variation in subjective responses, does not assume the existence of ground truth labels.

The present method exploits the relational data in the construction and application of the statistical model. Specifically, instead of the direct labels, the pair-wise status of agreement between labels given by different subjects is used. As a result, the multigraph agreement model is naturally applicable to more flexible types of responses, easily going beyond binary and categorical labels.

The experiments described in the present invention have validated the effectiveness of the present approach on real-world affective data.

In one embodiment, the present invention provides a system for improving quality of crowdsourced affective data based on agreement relationship between a plurality of annotators. The system may include a processor and a memory, the memory containing programming instructions thereon that, when executed, cause the processor to complete the steps including receiving a collection of stimuli, all the stimuli previously given affective labels by the plurality of annotators, constructing an agreement multigraph including a pair-wise status of agreement between the affective labels given by different ones of the plurality of annotators, the multigraph agreement model constructed as a probabilistic model, learning the probabilistic model computationally using the crowdsourced affective data, identifying a reliability of each of the plurality of annotators based on the learned model, and adjusting the crowdsourced affective data by calculating the affective labels of each stimulus based on the identified reliabilities of the plurality of annotators, thereby improving the quality of the crowdsourced affective data.

The present invention provides a method of improving quality of crowdsourced affective data based on agreement relationship between a plurality of annotators. The quality of the crowdsourced data is defined based on the reliability and informativeness of the data.

According to the present method, a collection of stimuli previously given affective labels by the plurality of annotators is received by a processor. The processor is used to execute an algorithm operative to perform the steps of the method. The method includes constructing an agreement multigraph including a pair-wise status of agreement between the affective labels given by different ones of the plurality of annotators, the multigraph agreement model constructed as a probabilistic model. Then a probabilistic model is learned computationally using the crowdsourced affective data. A reliability of each of the plurality of annotators is then identified based on the learned model. Once the model is learned and the reliabilities are identified, one can derive an adjusted version of affective data, in which one can re-calculate the consensus emotion label of each stimulus based on the reliabilities of annotators. This is how the new label based on the model is improved over raw averaged label where no estimation of annotator reliability is done.

The method may further include the step of assessing the stimuli on whether the stimuli evoke consensus emotion responses based on the learned model. For each of the stimuli, the assessing step will compute a confidence score based on the collected labels. Not all stimuli has the confidence to produce a good enough estimate of emotions. The assessing step will be useful if only the consensus labels are used to train a data-driven model, e.g. predicting emotions based on the content of stimulus.

Assessing stimuli evoking highly consensus emotion responses and identifying unreliable annotators are two sides of a learning process where the understanding of one side is recursively enhanced conditioned on what have been known on the other.

The affective labels may be binary, categorical, ordinal, or multi-dimensional and may include emotion dimensions including valence, arousal, dominance and likeness.

The affective labels may be continuous.

In an embodiment, the consensus of affective labels is at a global scale.

The unreliable annotators may be identified by observing the distribution of all labels of the annotator in different emotion dimensions and spotting abnormality.

BRIEF DESCRIPTION OF THE DRAWINGS

FIG. 10 is a histogram of image confidences estimated based on the method in accordance with an embodiment of the present invention (About 85% of images have a confidence scores higher than 90%);

FIG. 11A is an overhead curve based on subject filtering;

FIG. 11B is an overhead curve based on image filtering; (The overhead is quantified by the number of labels discarded after filtering); and FIG. 12 is a table showing oracles in the AMT data set.

DETAILED DESCRIPTION OF THE INVENTION

Figure 13:
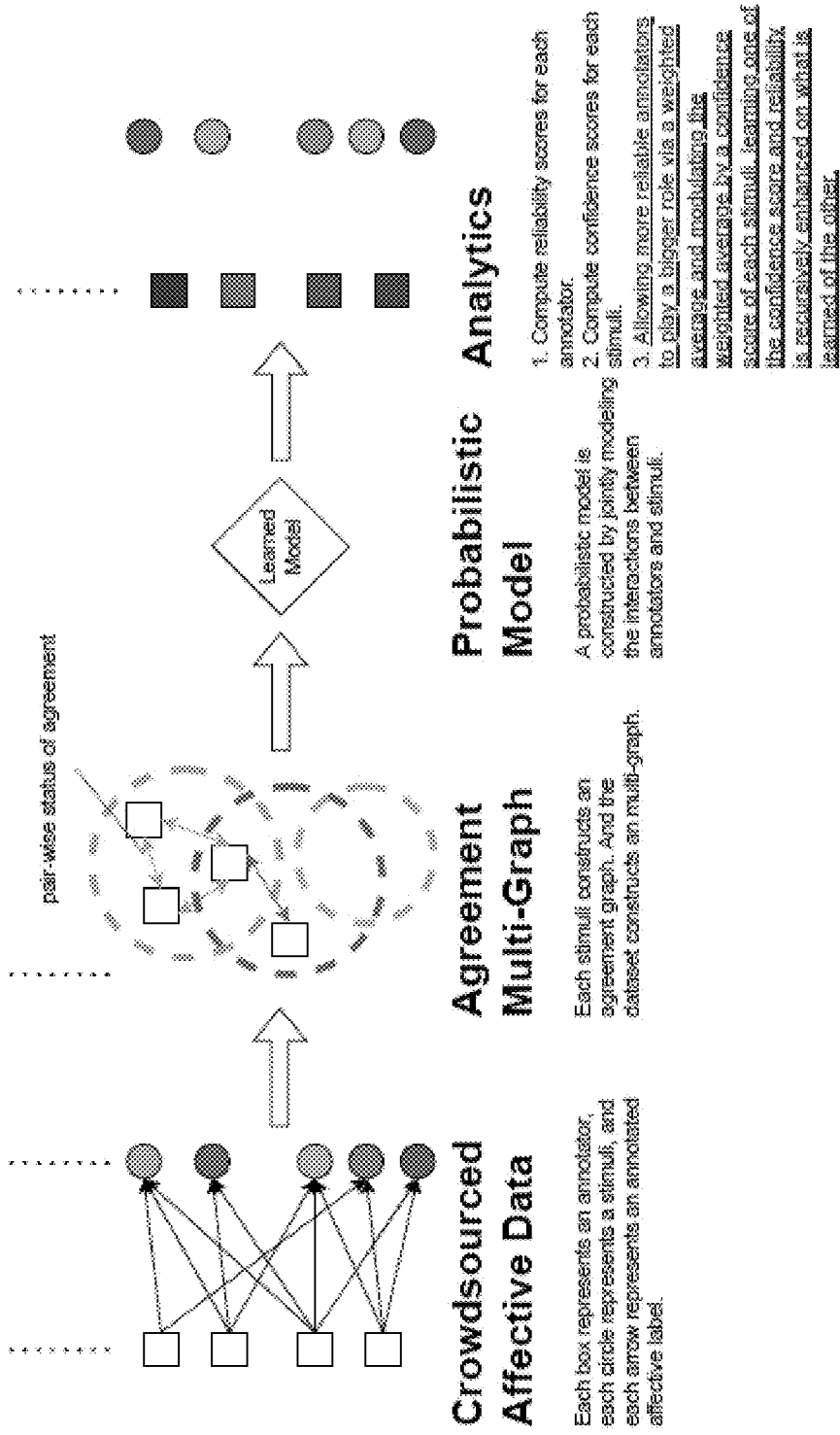
FIG. 13 is a flowchart showing a method according to an embodiment of the present invention.

FIG. 13 shows a flowchart which summarizes a method of the present invention. On the far left, each box represents an annotator. Each circle represents a stimuli. Each arrow represents an annotated affective label for a stimuli. An agreement graph is constructed for each stimuli, generating a multi-graph. A probablistic model is constructed by jointly modeling the interactions between the annotators and the stimuli. A reliability is computed for each annotator. A confidence score is computed for each stimuli. Learning one of the confidence score and reliability is recursively enhanced on what is learned of the other. Recalculating the affective labels of the each stimuli based on the identified reliability of each annotator, thereby improving the quality of the crowdsourced affective data.

Method

Mathematical Notations

First, the mathematical notations are presented. A symbol with subscript omitted always indicates an array, e.g., $x=(\ldots, x_i, \ldots)$. The arithmetic operations perform over arrays in the element-wise manner, e.g., $x+y=(\ldots, x_i+y_i, \ldots)$. Random variables are denoted as capital English letters. The tilde sign indicates the value of parameters in the last iteration of EM, e.g., $\tilde{\theta}$. Given a function $f_\theta$, we denote $f_{\tilde{\theta}}$ by $\tilde{f}_\theta$ or simply $\tilde{f}$, if the parameter $\tilde{\theta}$ is implied. Additional notations, as summarized in Table 1, will be explained in more details later.

TABLE 1

Symbols and descriptions of parameters, random variables, and statistics.

| Symbols | Descriptions |
| --- | --- |
| $O_i$ | subject i |
| $\tau_i$ | rate of subject reliability |
| $\alpha_i, \beta_i$ | shape of subject regularity |
| $\gamma$ | rate of agreement by chance |
| $\Theta$ | union of parameters |
| $T_j^{(k)}$ | whether $O_j$ reliably response |
| $J_i^{(k)}$ | rate of $O_i$ agreeing with other reliable responses |
| $I_{i,j}^{(k)}$ | whether $O_i$ agrees with the responses from $O_j$ |
| $\omega_i^{(k)}(\bullet)$ | cumulative degree of responses agreed by $O_i$ |
| $\psi_i^{(k)}(\bullet)$ | cumulative degree of responses |
| $r_j^{(k)}(\bullet)$ | a ratio amplifies or discounts the reliability of $O_j$ |
| $\tilde{\tau}_i^{(k)}$ | sufficient statistics of posterior $T_i^{(k)}$, given $\tilde{\Theta}$ |
| $\tilde{\alpha}_i^{(k)}, \tilde{\beta}_i^{(k)}$ | sufficient statistics of posterior $J_i^{(k)}$, given $\tilde{\Theta}$ |

Agreement Multigraph

The data may be represented as a directed multigraph, which does not assume a particular type of crowdsourced response. Suppose m questions have been prepared in the study, the answers can be binary, categorical, ordinal, and multidimensional. Given a subject pair (i,j) who are asked to look at the k-th question, one designs an agreement protocol that determines whether the answer from subject i agrees with that from subject j. If subject i's agrees with subject j's on task k, then we set $I_{i,j}^{(k)}=1$. Otherwise, $I_{i,j}^{(k)}=0$.

In the present case, we are given ordinal data from multiple channels, we define $I_{i,j}^{(k)}=1$ if (sum of) the percentile difference between two answers $a_i, a_j \in \{1, \ldots, A\}$ satisfies $$\tfrac{1}{2}|P[a_i^{(k)}]-P[a_j^{(k)}]|+\tfrac{1}{2}|P[a_i^{(k)}+1]-P[a_j^{(k)}+1]|\leq \delta \quad (1)$$

The percentile $P[\bullet]$ is calculated from the whole pool of answers for each discrete value, and $\delta=0.2$. In the above equation, the percentile difference between $a_i$ and $a_j$ as well as that between $a_i+1$ and $a_j+1$ are measured in order to reduce the effect of imposing discrete values on the answers that are by nature continuous. If the condition does not hold, they disagree and $I_{i,j}^{(k)}=0$. Assuming that if two scores for the same image are within a 20% percentile interval, they are considered to reach an agreement. Compared with setting a threshold on their absolute difference, such rule adapts to the non-uniformity of score distribution. Two subjects can agree with each other by chance or they indeed experience similar emotions in response to the same visual stimulus.

While the choice of the percentile threshold 6 is inevitably subjective, the selection in the present experiments was guided by the desire to trade-off the preservation of the original continuous scale of the scores (favoring small values) and a sufficient level of error tolerance (favoring large values). This threshold controls the sparsity level of the multi-graph, and influences the marginal distribution of estimated parameters. Alternatively, one may assess different values of the threshold and make a selection based on some other criteria of preference (if exist) applied to the final results.

Gated Latent Beta Allocation

This subsection describes the basic probabilistic graphical model we used to jointly model subject reliability, which is independent from the supplied questions, and regularity. We refrain from carrying out a full Bayesian inference because it is impractical to end users. Instead, the modes of the posterior are used as point estimates.

Figure 4:
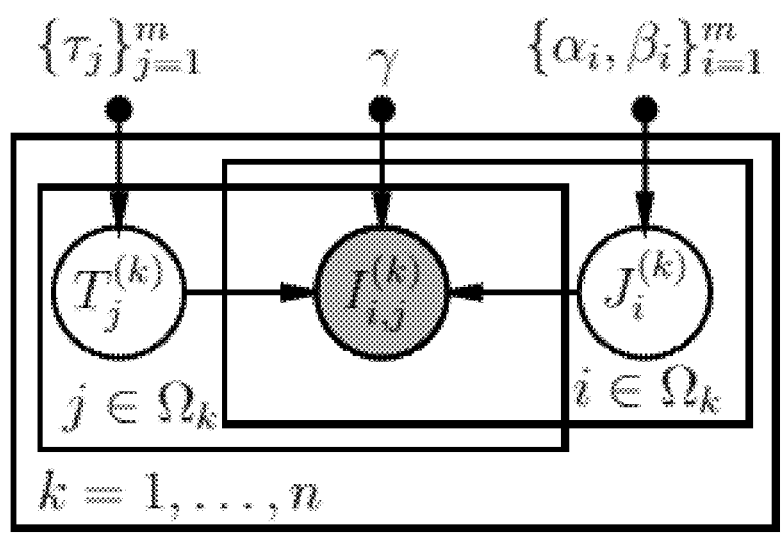
FIG. 4 is a schematic showing a probabilistic graphical model of the Gated Latent Beta Allocation in accordance with an embodiment of the present invention.

Assume that each subject i has a reliability parameter $\tau_i \in [0,1]$ and regularity parameters $\alpha_i, \beta_i > 0$ characterizing his or her agreement behavior with the population, for $i=1, \ldots, m$. A parameter $\gamma$ may also be used for the rate of agreement between subjects out of pure chance. Let $\Theta=(\{\tau_i, \alpha_i, \beta_i\}_{i=1}^m, \gamma)$ be the set of parameters. Let $\Omega_k$ be the a random sub-sample from subjects $\{1, \ldots, m\}$ who labeled the stimulus k, where $k=1, \ldots, n$. Also assume that sets $\Omega_k$'s are created independently from each other. For each image k, every subject pair from $\Omega_k^2$, i.e., (i,j) with $i \neq j$, has a binary indicator $I_{i,j}^{(k)} \in \{0,1\}$ coding whether their opinions agree on the respective stimulus. Assume that $I_{i,j}^{(k)}$ are generated from the following probabilistic process with two latent variables. The first latent variable $T_j^{(k)}$ indicates whether subject $O_j$ is reliable or not. Given that it is binary, a natural choice of model is the Bernoulli distribution. The second latent variable $J_i^{(k)}$, lying between 0 and 1, measures the extent subject $O_i$ agrees with the other reliable responses. Beta distribution parameterized by $\alpha_i$ and $\beta_i$ to model $J_i^{(k)}$ is used because it is a widely used parametric distribution for quantities on interval [0,1] and the shape of the distribution is relatively flexible. In a nutshell, $T_j^{(k)}$ is a latent switch (aka. gate) that controls whether $I_{i,j}^{(k)}$ can be used for the posterior inference of the latent variable $J_i^{(k)}$. Hence, the present model is called Gated Latent Beta Allocation (GLBA). A graphical illustration of the model is shown in FIG. 4.

The mathematical formulation of the model is presented as follows. For $k=1, \ldots, n$, we generate a set of random variables independently via $$T_j^{(k)} \; i.i.d. \sim \text{Bernoulli}(\tau_j), \; j \in \Omega_k, \quad (2)$$

$$J_i^{(k)} \; i.i.d. \sim \text{Beta}(\alpha_i, \beta_i), \; i \in \Omega_k, \quad (3)$$

$$I_{i,j}^{(k)} \mid T_j^{(k)}, J_i^{(k)} \sim \begin{cases} \text{Bernoulli}(J_i^{(k)}) & \text{if } T_j^{(k)} = 1 \\ \text{Bernoulli}(\gamma) & \text{if } T_j^{(k)} = 0 \end{cases} \quad (4)$$

where the last random process holds for any $j \in \Omega_k^{-i} := \Omega_k - \{i\}$ and $i \in \Omega_k$ with $k=1, \ldots, n$, and $\gamma$ is the rate of agreement by chance if one of i, j turns out to be unreliable. Here $\{I_{i,j}^{(k)}\}$ are observed data.

If a spammer is in the subject pool, his or her reliability parameter $\tau_i$ is zero, though others can still agree with his or her answers by chance at rate $\gamma$. On the other hand, if one is very reliable yet often provides controversial answers, his reliability $\tau_i$ can be one, while he typically disagrees with others, indicated by his high irregularity $$E[J_i^{(k)}] = \frac{\alpha_i}{\alpha_i + \beta_i} \approx 0.$$

We are interested in finding both types of subjects. However, most of subjects lie in between these two extremes.

As an interesting note, Eq. (4) is asymmetric, meaning that $I_{i,j}^{(k)} \neq I_{j,i}^{(k)}$ is possible, a scenario that should never occur by definitions of the two quantities. Symmetry may be achieved in the final model by using the conditional distribution of $I_{i,j}^{(k)}$ and $I_{j,i}^{(k)}$ given that $I_{i,j}^{(k)} = I_{j,i}^{(k)}$, and this model can be called the symmetrized model. With details omitted, it is stated that conditioned on $T_i^{(k)}$, $T_j^{(k)}$, $J_i^{(k)}$, and $J_j^{(k)}$, the symmetrized model is still a Bernoulli distribution:

$$I_{i,j}^{(k)} \sim \text{Bernoulli}\left(H\left((J_i^{(k)})^{T_i^{(k)}} \gamma^{1-T_i^{(k)}}, (J_j^{(k)})^{T_j^{(k)}} \gamma^{1-T_j^{(k)}}\right)\right), \quad (5)$$

where $$H(p, q) = \frac{pq}{pq + (1-p)(1-q)}.$$

The inference and estimation of the asymmetric model is tackled for simplicity.

Variational EM

Variational inference is an optimization based strategy for approximating posterior distribution in complex distributions. Since the full posterior is highly intractable, we consider to use variational EM to estimate the parameters $\Theta = (\{\tau_i, \alpha_i, \beta_i\}_{i=1}^m, \gamma)$. The parameter $\gamma$ is assumed to be pre-selected by the user and does not need to be estimated. To regularize the other parameters in estimation, the empirical Bayes approach is used to choose priors. Assume the following priors $$\tau_i \sim \text{Beta}(\tau_0, 1-\tau_0), \quad (6)$$

$$\alpha_i + \beta_i \sim \text{Gamma}(2, s_0). \quad (7)$$

By empirical Bayes, $\tau_0$, $s_0$ are adjusted. For the ease of notations, two auxiliary functions $\omega_i^{(k)}(\bullet)$ and $\psi_i^{(k)}(\bullet)$ are defined:

$$\omega_i^{(k)}(x) := \sum_{j \in \Omega_k^{-i}} x_j I_{i,j}^{(k)}, \psi_i^{(k)}(x) := \sum_{j \in \Omega_k} x_j. \quad (8)$$

Similarly, their siblings are defined $$\overline{\omega}^{(k)}(x) = \omega_i^{(k)}(1-x), \overline{\psi}_i^{(k)}(x) = \psi_i^{(k)}(1-x). \quad (9)$$

the auxiliary function $r_j(\bullet)$ is also defined as $$r_j^{(k)}(x) = \prod_{i \in \Omega_k^{-j}} \left(\frac{x_i}{\gamma}\right)^{I_{i,j}^{(k)}} \left(\frac{1-x_i}{1-\gamma}\right)^{1-I_{i,j}^{(k)}}. \quad (10)$$

Now the full likelihood function is defined:

$$L_k(\Theta; T^{(k)}, J^{(k)}, I^{(k)}) := \prod_{j \in \Omega_k} \left((\tau_j)^{T_j^{(k)}} (1-\tau_j)^{1-T_j^{(k)}}\right) \cdot \prod_{i \in \Omega_k} \frac{(J_i^{(k)})^{\alpha_i^{(k)}} (1-J_i^{(k)})^{\beta_i^{(k)}} \phi_i^{(k)}}{B(\alpha_i, \beta_i)}, \quad (11)$$

where auxiliary variables simplifying the equations are $$\alpha_i^{(k)} = \alpha_i + \omega_i^{(k)}(T^{(k)}),$$

$$\beta_i^{(k)} = \beta_i + \psi_i^{(k)} - \omega_i^{(k)}(T^{(k)}),$$

$$\phi_i^{(k)} = \gamma^{\overline{\omega}_i^{(k)}(T^{(k)})} (1-\gamma)^{\overline{\psi}_i^{(k)}(T^{(k)}) - \overline{\omega}_i^{(k)}(T^{(k)})},$$

and $B(\cdot, \cdot)$ is the Beta function. Consequently, assume the prior likelihood is $L_\Theta(\Theta)$, the MAP estimate of $\Theta$ is to minimize $$L(\Theta; T, J, I) := L_\Theta(\Theta) \prod_{k=1}^n L_k(\Theta; T^{(k)}, J^{(k)}, I^{(k)}). \quad (12)$$

The estimation is solved using variational EM method with a fixed $(\tau_0, s_0)$ and varying $\gamma$. The idea of variational methods is to approximate the posterior by a factorizable template, whose probability distribution minimizes its KL divergence to the true posterior. Once the approximate posterior is solved, it is then used in the E-step in the EM algorithm as the alternative to the true posterior. The usual M-step is unchanged. Each time $\Theta$ is estimated, prior $(\tau_0, s_0)$ is adjusted to match the mean of the MAP estimates of $\{\tau_i\}$ and $$\left\{\frac{\alpha_i + \beta_i}{2}\right\}$$

respective until they are sufficiently close.

(1) E-step

The factorized Q-approximation with variational principle is used:

$$p_\Theta(T^{(k)}, J^{(k)} | I^{(k)}) \approx \prod_{j \in \Omega_k} q^*_{T_j,\Theta}(T_j^{(k)}) \prod_{i \in \Omega_k} q^*_{J_i,\Theta}(J_i^{(k)}). \quad (13)$$

Let $$q^*_{T_j,\Theta}(T_j^{(k)}) \propto \exp(E_{j,T^{-j}}[\log L_k(\Theta; T^{(k)}, J^{(k)}, I^{(k)})]), \quad (14)$$

whose distribution can be written as $$\text{Bernoulli}\left(\frac{\tau_j R_j^{(k)}}{\tau_j R_j^{(k)} + 1 - \tau_j}\right), \text{ where}$$

$$\log R_j^{(k)} = E_J\left[\sum_{i \in \Omega_k^{-j}} \log(r_i^{(k)}(J^{(k)}))\right].$$

As suggested by Johnson and Kotz (Johnson, Kotz, and Balakrishnan 1995), the geometric mean can be numerically approximated by $$R_j^{(k)} \approx \prod^{i \in \Omega_k^{-j}} \frac{1}{\alpha_i^{(k)} + \beta_i^{(k)}} \left(\frac{\alpha_i^{(k)}}{\gamma}\right)^{I_{i,j}^{(k)}} \left(\frac{\beta_i^{(k)}}{1-\gamma}\right)^{1-I_{i,j}^{(k)}}, \quad (15)$$

if both $\alpha_i^{(k)}$ and $\beta_i^{(k)}$ are sufficiently larger than 1.

Let $$q_{J_i,\Theta}(J_i^{(k)}) \propto \exp(E_{T,J^{-i}}[\log L_k(\Theta; T^{(k)}, J^{(k)}, I^{(k)})]), \quad (16)$$

whose distribution is $$\text{Beta}(\alpha_i + \omega_i^{(k)}(\tau), \beta_i + \psi_i^{(k)}(\tau) - \omega_i^{(k)}(\tau)).$$

Given parameter $\tilde{\Omega} = \{\tilde{\tau}_i, \tilde{\alpha}_i, \tilde{\beta}_i\}_{i=1}$, the approximate posterior expectation of the log likelihood can be computed, which reads $$E_{T,J|\tilde{\Theta},I} \log L_k(\Theta; T^{(k)}, J^{(k)}, I^{(k)}) \approx \quad (17)$$

$$\text{const.} + \log L_\Theta(\Theta) + \sum^{j \in \Omega_k} \left(\tilde{\tau}_i^{(k)} \log \tau_j + (1 - \tilde{\tau}_j^{(k)}) \log(1 - \tau_j)\right) +$$

$$\sum^{i \in \Omega_k} \left\{ \binom{\alpha_i}{\beta_i}, \frac{\nabla B(\tilde{\alpha}_i^{(k)}, \tilde{\beta}_i^{(k)})}{B(\tilde{\alpha}_i^{(k)}, \tilde{\beta}_i^{(k)})} \right\} - \sum^{i \in \Omega_k} \log B(\alpha_i, \beta_i) +$$

$$\log \gamma \sum^{i \in \Omega_k} \varpi_i^{(k)}(\tilde{\tau}_i^{(k)}) + \log(1 - \gamma) \sum^{i \in \Omega_k} (\tilde{\psi}_i^{(k)}(\tilde{\tau}_i^{(k)}) - \varpi_i^{(k)}(\tilde{\tau}_i^{(k)})),$$

where relevant statistics are defined as $$\tilde{\alpha}_i^{(k)} = \tilde{\alpha}_i + \omega_i^{(k)}(\tilde{\tau}), \quad (18)$$

$$\tilde{\beta}_i^{(k)} = \tilde{\beta}_i + \psi_i^{(k)}(\tilde{\tau}) - \omega_i^{(k)}(\tilde{\tau}), \text{ and}$$

$$\tilde{\tau}_i^{(k)} = \frac{\tilde{R}_i^{(k)} \tilde{\tau}_i}{\tilde{R}_i^{(k)} \tilde{\tau}_i + 1 - \tilde{\tau}_i}.$$

Remark B(.,.) is the Beta function, and $\tilde{R}_i^{(k)}$ is calculated from approximation Eq (15).

(2) M-step

Compute the partial derivatives of L with respect to $\alpha_i$ and $\beta_i$: let $\Delta_i$ be the set of images that are labeled by subject i. We set $\partial L/\partial \alpha_i = 0$ and $\partial L/\partial \beta_i = 0$ for each i, which reads $$\left(\frac{\alpha_i + \beta_i}{s_0} - \log(\alpha_i + \beta_i)\right) \cdot \binom{1}{1} = \sum^{k \in \Delta_i} \frac{\nabla B(\tilde{\alpha}_i^{(k)}, \tilde{\beta}_i^{(k)})}{B(\tilde{\alpha}_i^{(k)}, \tilde{\beta}_i^{(k)})} - \frac{\nabla B(\alpha_i, \beta_i)}{B(\alpha_i, \beta_i)} = \quad (19)$$

$$\sum^{k \in \Delta_i} \begin{pmatrix} \Psi(\tilde{\alpha}_i^{(k)}) - \Psi(\tilde{\alpha}_i^{(k)} + \tilde{\beta}_i^{(k)}) \\ \Psi(\tilde{\beta}_i^{(k)}) - \Psi(\tilde{\alpha}_i^{(k)} + \tilde{\beta}_i^{(k)}) \end{pmatrix} - |\Delta_i| \cdot \begin{pmatrix} \Psi(\alpha_i) - \Psi(\alpha_i + \beta_i) \\ \Psi(\beta_i) - \Psi(\alpha_i + \beta_i) \end{pmatrix},$$

where $\Psi(x) \in [\log(x-1), \log x]$ is the Digamma function. The above two equations can be practically solved by Newton-Raphson method with a projected modification (ensuring $\alpha, \beta$ always are greater than zero).

Compute the derivatives of L with respect to $\tau_i$ and set $\partial L/\partial \tau_i = 0$, which reads $$\tau_i = \frac{1}{|\Delta_i| + 1}\left(\tau_0 + \sum_{k \in \Delta_i} \tilde{\tau}_i^{(k)}\right). \quad (20)$$

Compute the derivatives of L w.r.t. $\gamma$ and set to zero, which reads $$\gamma = \frac{\sum^{i \in \Omega_k} \varpi_i^{(k)}(\tilde{\tau}_i^{(k)})}{\sum^{i \in \Omega_k} \tilde{\psi}_i^{(k)}(\tilde{\tau}_i^{(k)})}. \quad (21)$$

In practice, the update formula for $\gamma$ needs not to be used if $\gamma$ is pre-fixed. See Algorithm 1 for details.

The Algorithm

The final algorithm is presented to estimate all parameters by knowing the multigraph data $\{I_{i,j}^{(k)}\}$. The present algorithm is designed based on Eqs. (19), (20), and (21). In each EM iteration, there are two loops: one for collecting relevant statistics for each subgraph, and the other for re-computing the parameter estimates for each subject. Please refer to Algorithm 1 for details.

---

Algorithm 1 Variational EM algorithm of GLBA
Input: A multi-graph $\{I_{i,j}^k \in \{0,1\}\}_{i,j \in \Omega_k}$, $0 < \gamma < 0.5$
Output: subject parameters $\Theta = (\{(\tau_i, \alpha_i, \beta_i)\}_{i=1}^m, \gamma)$
Initialisation : $\tau_0 = 0.5$, $\alpha_i = \beta_i = \tau_i = 1.0$, $i = 1, ..., m$
repeat
    for k=1 to n do
        compute statistics $\tilde{\alpha}_i^{(k)}$, $\tilde{\beta}_i^{(k)}$, $\tilde{\tau}_i^{(k)}$ by Eq. (18);
    end for
    for i=1 to m do
        solve $(\alpha_i, \beta_i)$ from Eq. (19) (Newton-Raphson);
        compute $\tau_i$ by Eq. (20);
    end for
    (optional) update $\gamma$ from Eq. (21);
until $\{(\tau_i, \alpha_i, \beta_i)\}_{i=1}^m$ are all converged.
return $\Theta$

---

Experiments

Data Sets

A crowdsourced affective data set acquired from the Amazon Mechanical Turk (AMT) platform (Lu 2015) is studied. The affective data set is a collection of image stimuli and their affective labels including valence, arousal, dominance and likeness (degree of appreciation). Labels for each image are ordinal: $\{1, \ldots, 9\}$ for the first three dimensions, and $\{1, \ldots, 7\}$ for the likeness dimension. The study setup and collected data statistics have been detailed in (Lu 2015), which are described briefly here for the sake of completeness.

At the beginning of a session, the AMT study host provides the subject brief training on the concepts of affective dimensions. Here are descriptions used for valence, arousal, dominance, and likeness.

Valence: degree of feeling happy vs. unhappy
    Arousal: degree of feeling excited vs. calm
    Dominance: degree of feeling submissive vs. dominant
    Likeness: how much you like or dislike the image The questions presented to the subject for each image are given below in exact wording.

Slide the solid bubble along each of the bars associated with the 3 scales (Valence, Arousal, and Dominance) in order to indicate how you ACTUALLY FELT WHILE YOU OBSERVED THE IMAGE.

How did you like this image? (Like extremely, Like very much, Like slightly, Neither like nor dislike, Dislike slightly, Dislike very much, Dislike extremely)

Each AMT subject is asked to finish a set of labeling tasks, and each task is to provide affective labels on a single image from a prepared set, called the EmoSet. This set contains around 40,000 images crawled from the Internet using affective keywords. Each task is divided into two stages. First, the subject views the image; and second, he/she provides ratings in the emotion dimensions through a Web interface. Subjects usually spend three to ten seconds to view each image, and five to twenty seconds to label it. The system records the time durations respectively for the two stages of each task and calculates the average cost (at a rate of about 1.4 US Dollars per hour). Around 4,000 subjects were recruited in total. For the experiments below, we retained image stimuli that have received affective labels from at least four subjects. Under this screening, the AMT data have 47,688 responses from 2,039 subjects on 11,038 images. Here, one response refers to the labeling of one image by one subject conducted in one task.

Because humans can naturally feel differently from each other in their affective experiences, there was no gold standard criterion to identify spammers. Such a human emotion data set is difficult to analyze and the quality of data is hard to assess. Among several emotion dimensions, we found that participants were more consistent in the valence dimension. As a reminder, valence is the rated degree of positivity of emotion evoked by looking at an image. We call the variance of the ratings from different subjects on the same image the within-task variance, while the variance of the ratings from all the subjects on all the images the cross-task variance. For valence and likeness, the within-task variance accounts for about 70% of the cross-task variance, much smaller than for the other two dimensions. Therefore, the remaining experiments were focused on evaluating the regularity of image valences in the data.

Baselines for Comparison

Below, several baseline methods or models are discussed to compare with the present method.

Dawid and Skene (Dawid and Skene 1979)

The general category of consensus methods in the literature of statistics and machine learning, where the spammer filtering decision is made completely based on the labels provided by observers, have been developed along the line of Dawid and Skene (Dawid and Skene 1979), and they mainly deal with categorical labels by modeling each observer using a designated confusion matrix. More recent developments of the observer models have been discussed in (Sheshadri and Lease 2013). To enable comparison with this baseline method, first each affective dimension is converted into a categorical label by thresholding. Three categories are created: high, neural, and low, each covering a continuous range of values on the scale. For example, high valence category implies a score greater than a neural score (i.e., 5) by more than a threshold (e.g., 0.5). Such a thresholding approach has been adopted in developing affective categorization systems, e.g. (Datta et al. 2006; Lu et al. 2012).

Time Duration.

In the practice of data collection, the host filtered spammers by a simple criterion—to declare a subject spammer if he spends substantially less time on every task. The labels provided by the identified spammers were then excluded from the data set for subsequent use, and the host also declined to pay for the task. However, some subjects who were declined to be paid wrote emails to the host arguing for their cases. Under this spirit, in our experiments, a baseline method is formed that uses the average time duration of each subject to red-flag a spammer Filtering Based on Gold Standard Examples.

Figure 9:
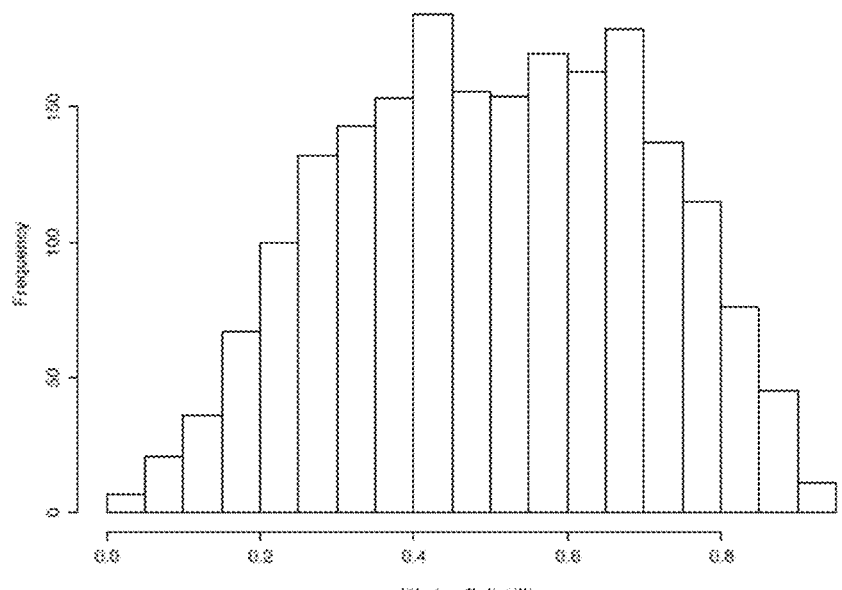
FIG. 9 is a histogram distribution of estimated worker reliabilities and statistics of simulated spammers based on 10 repeated runs, each with 10 spammers injected.

A widely used spammer detection approach in crowd-sourcing is to create a small set with known ground truth labels and use it to spot anyone who gives incorrect labels. However, such a policy was not implemented in the present data collection process because there is simply no ground truth for the emotion responses to an image in a general sense. On the other hand, just for the sake of comparison, it seems reasonable to find a subset of images that evoke such extreme emotions that ground truth labels can be accepted. This subset will then serve the role of gold standard examples. The present method is used to retrieve a subset of images which evoke extreme emotions with high confidence (see "Qualitative comparison based on controversial examples" Section for confidence score and emotion score calculation). For the valence dimension, at most 101 images were identified with valence score $\geq 8$ (on the scale of 1 . . . 9) with over 90% confidence and 37 images with valence score $\leq 2$ with over 90% confidence. Those images are looked at one by one (as provided in the supplementary materials) and believed that within a reasonable tolerance of doubt those images should evoke clear emotions in the valence dimension. Unfortunately, only a small fraction of subjects in our pool have labeled at least one image from this "gold standard" subset. Among this small group, their disparity from the gold standard enables us to find three susceptible spammers. To see whether these three susceptible spammers can also be detected by our method, we find that their reliability scores $\tau \in [0,1]$ are 0.11, 0.22, 0.35 respectively. In FIG. 9, we plot the distribution of $\tau$ of the entire subject pool. These three scores are clearly on the low end with respect to the scores of the other subjects. Thus the three spammers are also assessed to be highly susceptible by our model.

In summary, the first two baselines were able to be compared quantitatively with the present method.

Model Setup

Since our hypotheses included a random agreement ratio $\gamma$ that is pre-selected, we adjusted the parameter $\gamma$ from 0.3 to 0.48 to see empirically how it affects the result in practice.

Figure 5A:
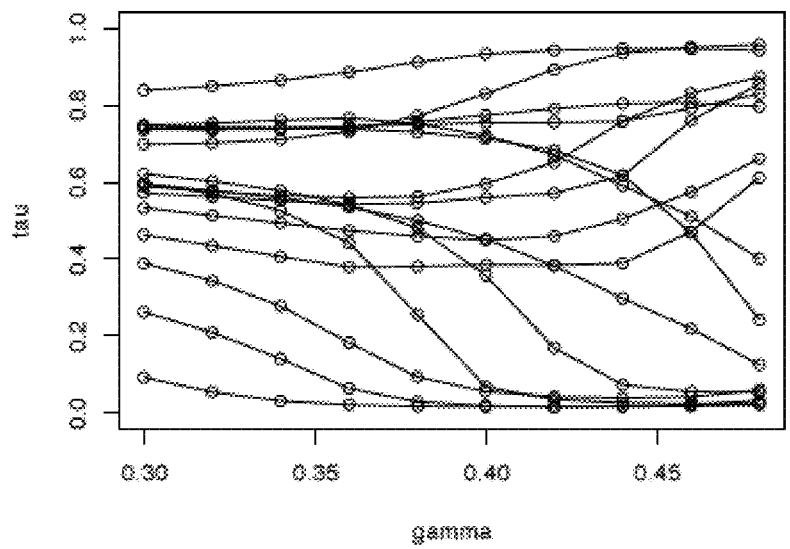
FIG. 5A is a plot showing reliability scores versus $\gamma \in [0:3; 0:48]$ for the top 15 users who provided the most numbers of ratings.
Figure 5B:
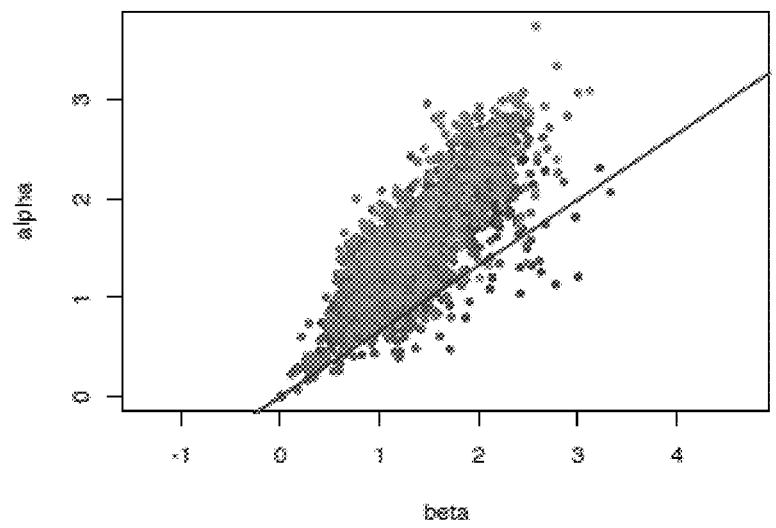
FIG. 5B is a plot showing visualization of the estimated regularity parameters of each worker at a give $\gamma$ (lighter dots are for workers with high reliability and darker dots for low reliability. The slope of the line equals $\gamma$)

FIGS. 5A and 5B depict how the reliability parameter $\tau$ varies with $\gamma$ for different workers in our data set. Results are shown for the top 15 users who provided the most numbers of ratings. Generally speaking, a higher $\gamma$ corresponds to a higher chance of agreement between workers purely out of random. From the figure, we can see that a worker providing more ratings is not necessarily more reliable. It is quite possible that some workers took advantage of the AMT study to earn monetary compensation without paying enough attention to the actual questions.

Figure 12:
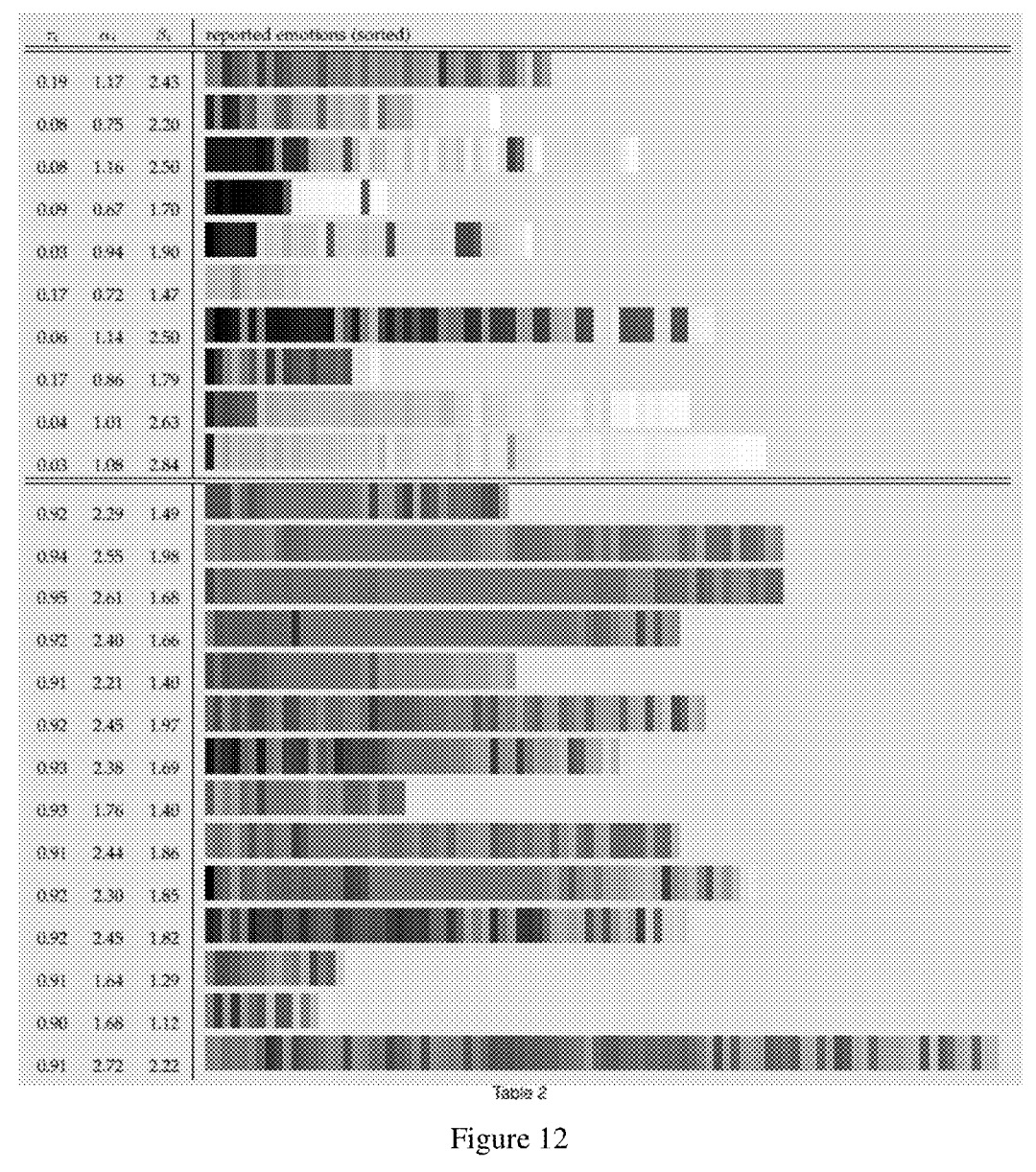

In Table 2 shown in FIG. 12, the valence, arousal, and dominance labels are demonstrated for two categories of subjects. On the top are malicious oracles whose $\alpha_i/\beta_i$ is among the lowest 30, meanwhile $|\Delta_i|$ is greater than 10. On the bottom are reliable oracles whose $\tau_i$ is among the top 30, meanwhile $\alpha_i/\beta_i > 1.2$. Their reported emotions are visualized by RGB colors. The estimate of $\theta$ is based on the valence dimension.

On the top, the first category on the top contains susceptible spammers with low estimated reliability parameter $\tau$; and on the bottom, the second category contains highly reliable subjects with high values of τ. Each subject takes one row. For the convenience of visualization, we represent the three-dimensional emotion scores given to any image by a particular color whose RGB values are mapped from the values in the three dimensions respectively. The emotion labels for every image by one subject are then condensed into one color bar. The labels provided by each subject for all his images are then shown as a palette in one row. For clarity, the color bars are sorted in lexicographic order of their RGB values. One can clearly see that those labels given by the subjects from these two categories exhibit quite different patterns. The palettes of the susceptible spammers are more extreme in terms of saturation or brightness. The abnormality of label distributions of the first category naturally originates from the fact that spammers intended to label the data by exerting the minimal efforts and without paying attention to the questions.

Basic Statistics of Manually Annotated Spammers

For each subject in the pool, by observing all his or her labels in different emotion dimensions, there was a reasonable chance of spotting abnormality solely by visualizing the distribution. If one were a spammer, it often happened that his or her labels were highly correlated, skewed or deviated in an extreme manner from a neural emotion along different dimensions. In such cases, it was possible to manually exclude his or her responses from the data due to his or her high susceptibility. This same practice is applied to identifying highly susceptible subjects from the pool. About 200 susceptible participants were found.

Figures 6A, 6B, 6C:
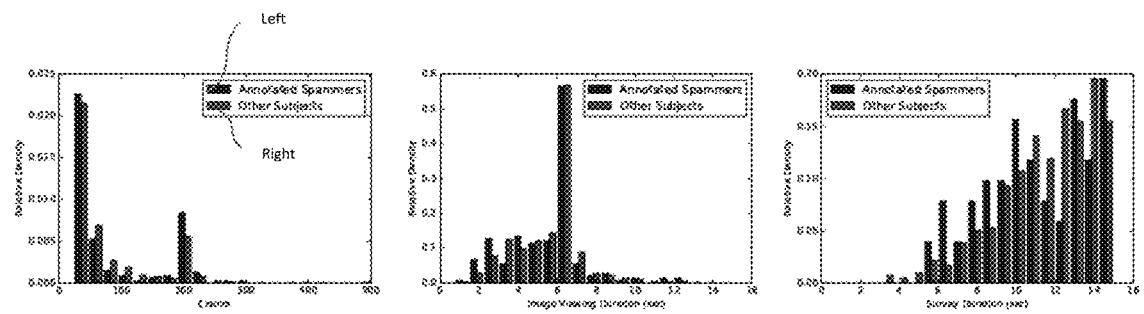
FIG. 6A is a normalized histogram showing basic statistics including total number of tasks completed (for each pair of bars, on the left are the annotated spammers, on the right are the other subjects)
FIG. 6B is a normalized histogram showing basic statistics including average time duration spent at each of the two stages per task (for each pair of bars, on the left are the annotated spammers, on the right are the other subjects)
FIG. 6C is a normalized histogram showing basic statistics including survey per task (for each pair of bars, on the left are the annotated spammers, on the right are the other subjects)

Several basic statistics of this subset were studied in comparison with the whole population: total number of tasks completed, average time duration spent on image viewing and survey per task. The histograms of these quantities are plotted in FIGS. 6A 6C. One can see that the annotated spammers did not necessarily spend less time or finish fewer tasks than the others, and the time duration has shown only marginal sensitivity to those annotated spammers. The figures demonstrate that those statistics are not effective criteria for spammer filtering.

This subset of susceptible subjects will be used as a "pseudo-gold standard" set for quantitative comparisons of our method and the baselines in the subsequent studies. As explained previously in "Baselines for comparison" section, other choices of constructing a gold standard set either conflict the high variation nature of emotion responses or yield only a tiny (of size three) set of spammers.

Top-K Precision Performance in Retrieving the Real Spammers

Experiments were conducted on each affective dimension to evaluate whether the subjects with the lowest estimated τ were supposed to be real spammers according to the "pseudo-gold standard" subset constructed in Section [sec: spammer]. Since there was no gold standard to correctly classify whether one subject was truly a spammer or not, we have been agnostic here. Based on that subset, the top-K precision were able to be partially evaluated in retrieving the real spammers, especially the most susceptible ones.

Figure 7:
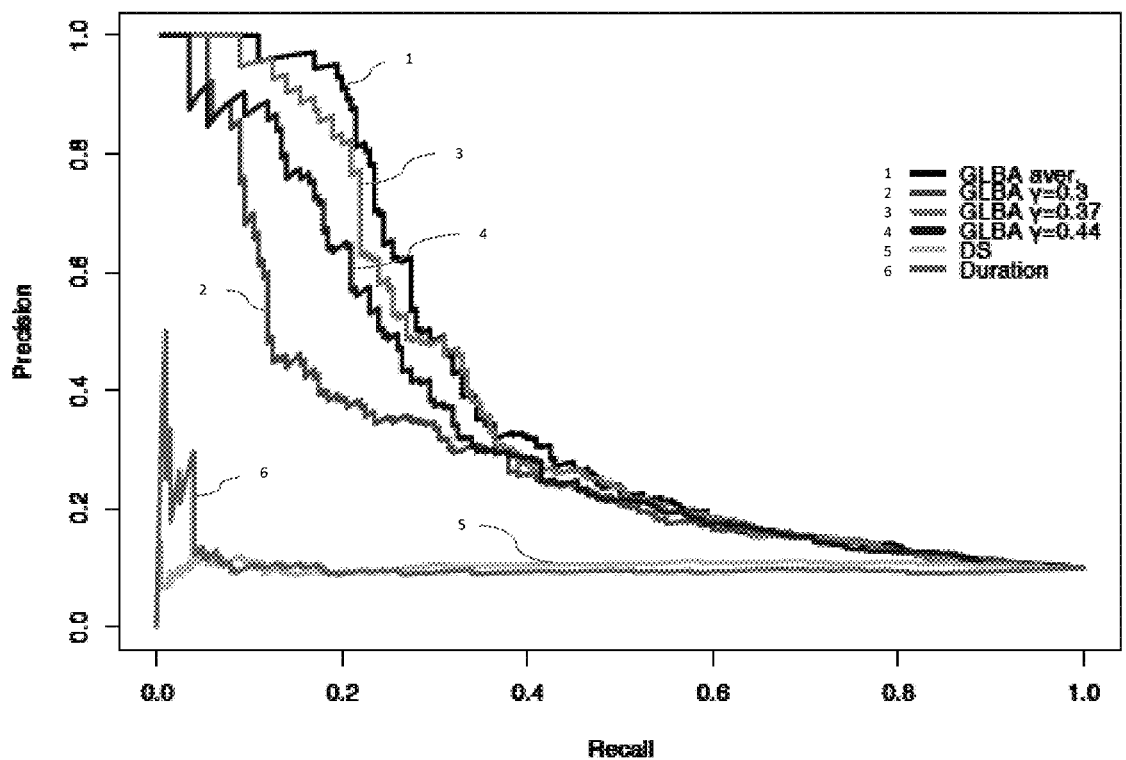
FIG. 7 is an agnostic Precision-Recall curve (by valence) based on manually annotated spammers.

Specifically, the reliability parameter τ for each subject was computed and the K subjects with the lowest values were chosen as the most susceptible spammers. Because τ depends on the random agreement rate γ, τ's were computed using 10 values of γ evenly spaced out over interval [0.3, 0.48]. The average value of τ was then used for ranking. The agnostic Precision-Recall curves (by valence) based on manually annotated spammers are shown in FIG. 7.

The present method achieves high top-K precision by retrieving the most susceptible subjects from the pool according to the average τ. In particular, the top-20 precision is 100%, the top-40 precision is 95%, and the top-60 precision is 78%. Clearly, the present algorithm has yielded results well aligned with the human judgment on the most susceptible ones. In FIG. 7, Precision Recall Curves were plotted by fixing γ to 0.3,0.37,0.44 and using the corresponding r. The result at γ=0.37 is better than the other two across recalls, indicating that a proper level of the random agreement rate can be important for achieving the best performance Two baselines are compared: the Dawid and Skene (DS) approach and the time duration based approach. The two baseline methods are clearly not competitive in this evaluation. The Dawin-Skene method (Dawid and Skene 1979), widely used in processing crowdsourced data with objective ground truth labels, drops quickly to a remarkably low precision even at a low recall. The time duration method, used in the practice of AMT host, is better than the Dawin-Skene method, yet substantially worse than the performance of our method.

Figure 8:
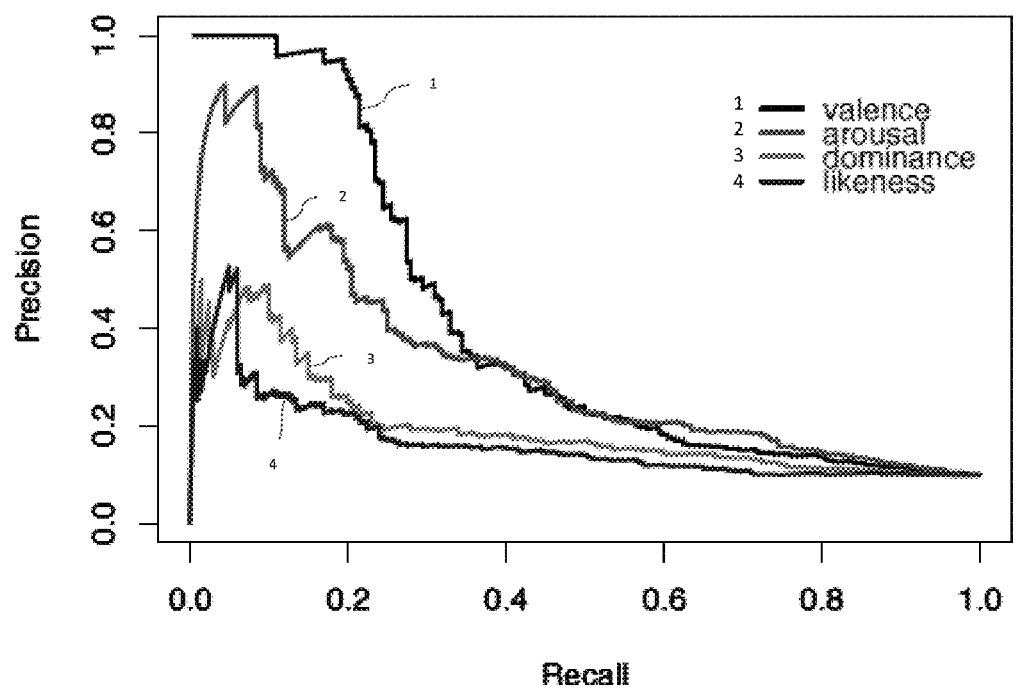
FIG. 8 is an agnostic Precision-Recall curve based on manually annotated spammers computed from different affective dimensions: valence, arousal, dominance, and likeness.

This same method of identifying spammers was tested using affective dimensions other than valence. As shown in FIG. 8, the two most discerning dimensions were valence and arousal. It is not surprising that people can reach relatively higher consensus when rating images by these two dimensions than by dominance or likeness. Dominance is much more likely to draw on evidence from context and social situation in most circumstances and hence less likely to have its nature determined to a larger extent by the stimulus itself.

Recall Performance in Retrieving the Simulated Spammers

The evaluation of top-K precision was limited in two respects: (1) the susceptible subjects were identified because we could clearly observe their abnormality in terms of the multivariate distribution of provided labels. If the participant labeled the data by acting exactly the same as the distribution of the population, him/her could not be manually identified using the aforementioned methodology. (2) there is still need to determine if one is a spammer, how likely it is to spot him/her.

In this study, several highly "intelligent" spammers were simulated, who labeled the data by exactly following the label distribution of the whole population. Every time, 10 spammers were generated, who randomly labeled 50 images. The labels of simulated spammers were not overlapping. Those labels of the simulated spammers were mixed with the existing data set, and then the present method was conducted again to determine how accurate our approach was with respect to finding the simulated spammers. This process was repeated 10 times in order to estimate the τ distribution of the simulated spammers. Results are reported FIG. 9. The histogram was drawn of the estimated reliability of all real workers and compared to the estimated reliability of simulated spammers (in the table included in FIG. 9). It is noted that more than half of the simulated spammers were identified as highly susceptible based on the τ estimation (≤0.2), and none of them were supposed to have a high reliability score (≥0.6). This result validates that the present method is robust enough to spot the "intelligent" spammers, even if they disguise themselves as random labelers within a population.

Qualitative Comparison Based on Controversial Examples

To re-rank the emotion dimensions and likenesses of stimuli with the reliability of the subject accounted for, the following formula was adopted to find the stimuli with "reliably" highest ratings. Assume each rating $\alpha_i \in [0,1]$. The following is defined to replace the usual average:

$$b_k := \underbrace{\frac{\sum_{i \in \Omega_k} \tau_i a_i^{(k)}}{\sum_{i \in \Omega_k} \tau_i}}_{est.score} \cdot \underbrace{\left(1 - \prod_{i \in \Omega_k}(1-\tau_i)\right)}_{confidence}, \text{ where}$$

$$\left(1 - \prod_{i \in \Omega_k}(1-\tau_i)\right) \in [0,1]$$

is the cumulative confidence score for image k. This adjusted rating $b_k$ not only allows more reliable subjects to play a bigger role via the weighted average (the first term of the product) but also modulates the weighted average by the cumulative confidence score for the image. Similarly, in order to find those with "reliably" lowest ratings, $a_i^{(k)}$ is replaced with $(1-a_i^{(k)})$ in the above formula and then still seek for the images with the highest $b_k$'s.

Figure 1:
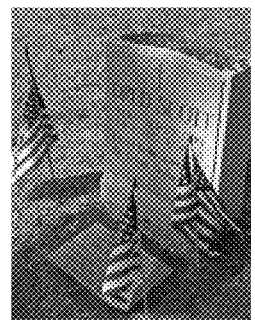
FIG. 1 is an example illustrating the need to acquire more reliable labels to ensure the image confidence is more than 0.9.
Figure 2:
FIG. 2 is a collection of images considered of lower valence than their average valence ratings (i.e., evoking a higher degree of negative emotions) after processing the data set and eliminating the contamination introduced by spammers using a method in accordance with an embodiment of the present invention.
Figure 3:
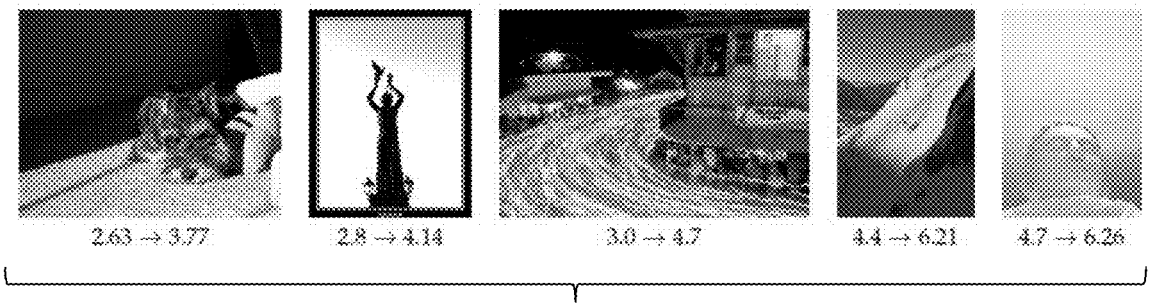
FIG. 3 is a collection of images considered of higher valence than their average valence ratings (i.e., evoking a higher degree of positive emotions) after processing the data set using the present method.

If $b_k$ is higher than a neutral level, then the emotional response to the image is considered high. FIG. 10 shows the histogram of image confidence scores estimated by the present method. More than 85% of images had acquired a sufficient number of quality labels. To obtain a qualitative sense of the usefulness of the reliability parameter $\tau$, the present approach is compared with the simple average-and-rank scheme by examining controversial image examples according to each emotion dimension. Here, being controversial means the assessment of the average emotion response for an image differs significantly between the methods. Despite the variability of human nature, the majority of the population was quite likely to reach consensus for a portion of the stimuli. Therefore, this investigation is meaningful. In FIG. 2 and FIG. 3, example image stimuli are shown that were recognized to clearly deviate from neutral emotions by one method but not agreed upon by the other. Stimuli images were skipped that were fear inducing, visually annoying or improper. Interested readers can see the complete results in the supplementary material.

Cost/Overhead Analysis

There is an inevitable trade-off between the quality of the labels and the average cost of acquiring them when screening is applied based on reliability. If a higher standard is set for reliability, the quality of the labels retained tends to improve but fewer labels were left to use. It is interesting to visualize the trade-off quantitatively. Let us define overhead numerically as the number of labels removed from the data set when quality control is imposed; and let the threshold on either subject reliability or image confidence used to filter labels be the index for label quality. Overhead curves are obtained in FIGS. 11A and 11B. FIG. 11A is an overhead curve based on subject filtering. The overhead is quantified by the number of labels discarded after filtering. In FIG. 11A, the result is based on filtering subjects with reliability scores below a threshold (all labels given by such subjects are excluded); In FIG. 11B, it is based on filtering images with confidence scores below a threshold. As shown by the plots, if either the labels from subjects with reliability scores below 0.3 are discarded or those for images with confidence scores below 90% are discarded, roughly 10,000 out of 47,688 labels are deemed unusable. At an even higher standard, e.g., subject reliability ≥0.5 or image confidence level ≥95%, around half of the labels will be excluded from the data set. Although this means the average per label cost is doubled at the stringent quality standard, we believe the screening is worthwhile in comparison with analysis misled by wrong data. In a large-scale crowdsource environment, it is simply impractical to expect all the subjects to be fully serious. This contrasts starkly with a well-controlled lab environment for data collection. In a sense, post-collection analysis of data to ensure quality is unavoidable. It is indeed a matter of which analysis should be applied.

Discussion

Results

It is found that the crowdsourced affective data that are examined in the present invention are particularly challenging for the conventional school of observer models, developed along the line of Dawid and Skene (Dawid and Skene 1979). Two major reasons are identified. First, each image in our data set has a much smaller number of observers, compared with what are typically studied in the benchmarks (Sheshadri and Lease 2013). In the present data set, most images were only labeled by 4 to 8 subjects, while many existing benchmark data sets have tens of subjects per task. Second, a more profound reason is that most images do not have a ground truth affective label at the first place. This can render ineffective many statistical methods which model the user-task confusion matrix and hence count on the existence of "true" labels and the fixed characteristics of uncertainty in responses.

The present experiments demonstrate that valence and arousal are the two most effective dimensions that can be used to analyze the reliability of subjects. Although subjects may not reach a consensus at local scales (say, an individual task) because the emotions are inherently subjective, consensus at a global scale can still be well justified.

Usage Scenarios

The scenarios under which our method is more suitable are articulated.

First, the present method is not meant to replace traditional approaches that add control factors at the design stage of the experiments, for example, recording task completion time, and testing subjects with examples annotated with gold standard labels. Those methods are effective at identifying extremely careless subjects. But the reliability of a subject is often not a matter of yes or no, but can take a continuum of intermediate levels. Moreover, consensus models such as Dawid-Skene methods require that each task is assigned to multiple annotators.

Second, the present method can be integrated with other approaches so as to collect data most efficiently. Traditional heuristic approaches require the host to come up with a number of design questions or procedures effective for screening spammers before executing the experiments, which can be a big challenge especially for affective data. In contrast, the consensus models support post analyses of collected data and have no special requirement for the experimental designs. This suggests us to use a consensus model to carry out a pilot study which then informs us how to best design the data collection procedure.

Third, the present approach is unique in terms of its fundamental assumptions, and hence should be utilized in quite different scenarios than the other models. Methods based on modeling confusion matrix are more suitable for aggregating binary and categorical labels, while the agreement-based methods (ours included) are more suitable for continuous and multi-dimensional labels (or more complicated structures) that normally have no ground truth. The former are often evaluated quantitatively by how accurately they estimate the true labels, while the latter are evaluated directly by how effectively they identify unreliable annotators, a perspective barely touched in the existing literature.

Future Work

There are interesting questions left about the statistical model of the present invention.

Some choices of parameters in the model are quite heuristic. The usage of the present model requires pre-set values for certain parameters, e.g., $\gamma$, but theoretically pinned-down guidelines has not been found on how to choose those parameters. As a result, it is always subjective to some extent to declare a subject spammer. The ranking of reliability of subjects seems easier to accept. Where the cutoff should be will involve some manual checking on the result or will be determined by some other factors such as the desired cost of acquiring a certain amount of data.

Only one "major" reliable mode was assumed at one time, and hereafter only the regularities conditioned on this mode are estimated. In another word, all the reliable users are assumed to behave consistently. One may ask whether there exist subgroups of reliable users who behave consistently within a group but differ across groups for reasons such as different demographic backgrounds. In the current model, if such "minor" reliable mode exists in a population, these subjects may be absorbed into the spammer group. Our model implicitly assumes that diversity in demography or in other aspects does not cause influential differences in emotion responses. Because of this, the present method in dealing with culturally sensitive data may be further improved.

The focus has been on the post analysis of collected data so far. It may also be of interest to examine the capacity of the present approach to reduce time and cost in the practice of crowdsourcing using A/B test. An online heuristic strategy to dynamically allocate tasks to more reliable subjects is hereby briefly discussed. Recall that the present model has two sets of parameters: parameter $\tau_i$ indicating the reliability of subjects and parameter $\alpha_i$; $\beta_i$ capturing the regularity. The variance of distribution Beta($\alpha_i, \beta_i$) may be used to determine how confident we are with the estimation of $\tau_i$. For subject i, if the variance of Beta ($\alpha_i, \beta_i$) is smaller than a threshold while $\tau_i$ is below a certain percentile, this subject is considered confidently unreliable and he/she may be excluded from the future subject pool.

REFERENCES

Datta, Ritendra, Dhiraj Joshi, Jia Li, and James Z Wang. 2006. "Studying Aesthetics in Photographic Images Using a Computational Approach." In *European Conference on Computer Vision*, 288-301. Springer.

Lu, Xin, Poonam Suryanarayan, Reginald B Adams Jr, Jia Li, Michelle G Newman, and James Z Wang. 2012. "On Shape and the Computability of Emotions." In *Proceedings of the 20th Acm International Conference on Multimedia*, 229-38. ACM.

Lu, Xin. 2015. "Visual Characteristics for Computational Prediction of Aesthetics and Evoked Emotions." PhD thesis, The Pennsylvania State University. https://etda.libraries.psu.edu/catalog/28857.

Dawid, Alexander Philip, and Allan M Skene. 1979. "Maximum Likelihood Estimation of Observer Error-Rates Using the Em Algorithm." *Applied Statistics*. JSTOR, 20-28.

Sheshadri, Aashish, and Matthew Lease. 2013. "SQUARE: A Benchmark for Research on Computing Crowd Consensus." In *First Aaai Conference on Human Computation and Crowdsourcing*, 156-64.

The invention claimed is:

1. A method of improving quality of crowdsourced affective data based on agreement relationship between a plurality of annotators, the method comprising steps of: receiving, by a processor, a collection of stimuli, all the stimuli previously given affective labels by the plurality of annotators; executing, by the processor, an algorithm operative to perform the following steps: constructing a multigraph agreement model including a pair-wise status of agreement between the affective labels given by different ones of the plurality of annotators, the multigraph agreement model constructed as a probabilistic model; learning the probabilistic model computationally using the crowdsourced affective data to generate a learned model; repeatedly: assessing a confidence score of each stimuli based on the learned model, the confidence score indicating whether the stimuli has a confidence of evoking consensus emotion responses; and identifying a reliability of each of the plurality of annotators based on the learned model; and adjusting the crowdsourced affective data by: recalculating the affective labels of each stimuli based on the identified reliability of each of the plurality of annotators, thereby improving the quality of the crowdsourced affective data, wherein learning one of the confidence score and reliability is recursively enhanced on what is learned of an other of the confidence score and reliability.

2. The method according to claim 1, wherein the probabilistic model is based on a reliability parameter for measuring how likely an annotator responds to a question seriously, regularity parameters for measuring how the annotator agrees with other seriously-entered responses from a targeted population, and the probabilistic model is further based on a pre-set rate of agreement-by-chance for each annotator.

3. The method according to claim 1, further comprising the step of assessing the stimuli on whether the stimuli evoke consensus emotion responses based on the learned model.

4. The method according to claim 3, wherein identifying stimuli evoking highly consensus emotion responses and identifying unreliable annotators are two sides of a learning process where the understanding of one side is recursively enhanced conditioned on what have been known on the other.

5. The method according to claim 1, wherein each annotator pair has a binary indicator indicating whether the annotator pair's affective labels agree on a stimulus, the binary indicator forming the agreement multigraph.

6. The method according to claim 5, wherein the probabilistic model is a gated latent beta allocation (GLBA) model, the GLBA model having a first latent variable and a second latent variable for each annotator, the first latent variable indicating whether the annotator is reliable, the first latent variable having a Bernoulli distribution based on the reliability parameter, the second latent variable for each annotator indicating the extent the annotator agrees with the other reliable responses, the second latent variable having a Beta distribution parameterized by regularity parameters; and wherein the first latent variable is a latent switch that controls whether the binary indicator for the annotator pair can be used for the posterior inference of the second latent variable.

7. The method according to claim 6, wherein the binary indicator has: a Bernoulli distribution based on the second latent variable of the first annotator if the first latent variable indicates that the second annotator is reliable; and a Bernoulli distribution based on the rate of agreement by chance if the first latent variable indicates that the second annotator is unreliable.

8. The method according to claim 1, wherein the affective labels are binary, categorical, ordinal, or multi-dimensional.

9. The method according to claim 1, wherein the affective labels include emotion dimensions including valence, arousal, dominance and likeness.

10. The method according to claim 1, wherein the affective labels are continuous.

11. The method according to claim 1, wherein the method starts from a multigraph structure among subjects that is coordinated by tasks, a task defined as each annotator annotating each stimulus with affective labels.

12. The method according to claim 1, wherein the annotators' performance is modeled in two modes via the multigraph, the two modes including a reliable mode where the behaviors of the annotators are assumed to be different and a random mode where the behavior is assumed to be shared across different annotators.

13. The method according to claim 2, wherein the statistical method is a variational expectation-maximization (EM) algorithm to estimate the reliability and regularity parameters, including: (a) collecting relevant statistics for each graph of the multigraph agreement model based on the reliability and regularity parameters; (b) computing a maximum a posteriori probability (MAP) estimates of each subject's reliability and regularity parameters based on a variational EM framework; and (c) iteratively repeating (a) and (b) until the parameters of the model converge according to a preset threshold on the difference between two consecutive iterations.

14. The method according to claim 6, wherein the GLBA model is made symmetric by using a conditional distribution.

15. The method according to claim 1, wherein the probabilistic model is based on the assumption that emotions are inherently subjective and there are no ground truth affective labels.

16. The method according to claim 1, wherein the consensus of affective labels is at a global scale.

17. The method according to claim 1, wherein the unreliable annotators are identified by observing the distribution of all labels of the annotator in different emotion dimensions and spotting abnormality.

18. A system for improving quality of crowdsourced affective data based on agreement relationship between a plurality of annotators, comprising: a processor; a memory, the memory containing programming instructions thereon that, when executed, cause the processor to complete the steps including: receiving a collection of stimuli, all the stimuli previously given affective labels by the plurality of annotators; constructing a multigraph agreement model including a pair-wise status of agreement between the affective labels given by different ones of the plurality of annotators, the multigraph agreement model constructed as a probabilistic model; learning the probabilistic model computationally using the crowdsourced affective data to generate a learned model; repeatedly: assessing a confidence score of each stimuli based on the learned model, the confidence score being whether the stimuli has a confidence of evoking consensus emotion responses; identifying a reliability of each of the plurality of annotators based on the learned model; and adjusting the crowdsourced affective data by: recalculating the affective labels of each stimuli based on the identified reliability of each of the plurality of annotators, thereby improving the quality of the crowdsourced affective data, wherein learning one of the confidence score and reliability is recursively enhanced on what is learned of an other of the confidence score and reliability.

19. The system according to claim 18, wherein the steps further including assessing the stimuli on whether the stimuli evoke consensus emotion responses based on the learned model.

20. The method according to claim 1, wherein adjusting the crowdsourced affective data comprises allowing more reliable annotators to play a bigger role via a weighted average and modulating the weighted average by a confidence score of each stimuli.

* * * * *